US010444417B2

(12) United States Patent
Lam

(10) Patent No.: US 10,444,417 B2
(45) Date of Patent: Oct. 15, 2019

(54) OPTICAL LIMITERS FOR FACILITATING APERTURE PROTECTION

(71) Applicant: The Boeing Company, Chicago, IL (US)

(72) Inventor: Tai Anh Lam, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 127 days.

(21) Appl. No.: 15/716,364

(22) Filed: Sep. 26, 2017

(65) Prior Publication Data

US 2019/0094430 A1  Mar. 28, 2019

(51) Int. Cl.
*G02F 1/01* (2006.01)
*G02B 5/22* (2006.01)
*G02B 5/28* (2006.01)

(52) U.S. Cl.
CPC .............. *G02B 5/22* (2013.01); *G02B 5/282* (2013.01); *G02F 2203/52* (2013.01)

(58) Field of Classification Search
CPC .......... G02F 1/0147; G02F 1/137; G02F 1/19; G02F 2001/1352; G02F 2001/13756; G02F 2203/12; G02F 2203/52; G02F 1/01; E06B 2009/2417; E06B 2009/2464; E06B 3/6722; E06B 9/24; G02B 26/06; G02B 5/282
See application file for complete search history.

(56) References Cited

U.S. PATENT DOCUMENTS

| 5,208,696 A * | 5/1993 | Kobayashi | G02F 1/0333 359/238 |
| 6,072,565 A * | 6/2000 | Porter | G01C 3/04 348/31 |
| 6,348,990 B1 * | 2/2002 | Igasaki | G02F 1/135 349/17 |
| 2004/0012835 A1 * | 1/2004 | Ohbayashi | G02B 5/0833 359/237 |
| 2004/0232403 A1 * | 11/2004 | Sillmon | H01J 9/12 257/10 |

(Continued)

OTHER PUBLICATIONS

"Timing Nature's Fastest Optical Shutter", PHYS ORG, Apr. 7, 2005, pp. 1-3, [online], [retrieved on Sep. 26, 2017]. Retrieved from the Internet: <URL:https://phys.org/news/2005-04-natures-fastest-optical-shutter.html>.

(Continued)

*Primary Examiner* — William R Alexander
*Assistant Examiner* — Balram T Parbadia
(74) *Attorney, Agent, or Firm* — Haynes and Boone, LLP

(57) ABSTRACT

Various techniques provide optical limiters for facilitating aperture protection. In one example, a system includes an optical device. The optical device includes a photocathode configured to emit electrons in response to an applied voltage and an incident light. The optical device further includes a phase change material. At least a portion of the phase change material is configured to receive the electrons from the photocathode. The portion is further configured to transition from a first phase to a second phase in response to the electrons. The portion is further configured to reflect the incident light when the portion of the phase change material is in the second phase. Related methods and products are also provided.

20 Claims, 3 Drawing Sheets

(56) References Cited

U.S. PATENT DOCUMENTS

| | | | | |
|---|---|---|---|---|
| 2010/0225989 A1* | 9/2010 | Anders | ............ | G02F 1/19 359/288 |
| 2012/0019891 A1* | 1/2012 | Dewell | ............ | G02F 1/163 359/275 |
| 2017/0122028 A1* | 5/2017 | Suzuka | ............ | E06B 9/24 |

OTHER PUBLICATIONS

Salisbury, David, "Nanoscale Optical Switch Breaks Miniaturization Barrier", PHYS ORG, Mar. 13, 2014, pp. 1-3, [online], [retrieved on Sep. 26, 2017]. Retrieved from the Internet: <URL: https://phys.org/news/2014-03-nanoscale-optical-miniaturization-barrier.html>.

Dicken et al., "Frequency Tunable Near-Infrared Metamaterials Based on VO2 Phase Transition", Sep. 25, 2009, 10 pages, vol. 17, No. 20, Optics Express.

Gan et al., "Optical and Electrical Properties of Sputtered Vanadium Oxide Films", May 17, 2004, pp. 879-882, American Vacuum Society.

Jepsen et al. "Metal-Insulator Phase Transition in a VO2 Thin Film Observed with Terahertz Spectroscopy", Physical Review B, Nov. 6, 2006, pp. 1-9, vol. 74, Issue 20, The American Physical Society.

Kubler et al., "Coherent Structural Dynamics and Electronic Correlations During an Ultrafast Insulator-to-Metal Phase Transition in VO2", Physical Review Letters, Sep. 13, 2007, pp. 1-4, vol. 99, Issue 11, The American Physical Society.

Nakajima et al., "Photoinduced Metallic State in VO2 Proved by the Terahertz Pump-Probe Spectroscopy", Applied Physics Letter, Jan. 4, 2008, 3 pages, vol. 92, Issue 1, American Institute of Physics.

Qazilbash et al., "Infrared Spectroscopy and Nano-Imaging of the Insulator-to-Metal Transition in Vanadium Dioxide", Physical Review B, Feb. 10, 2009, pp. 1-10, vol. 79, Issue 7, The American Physical Society.

Ben-Messaoud et al. "High Contrast Optical Switching in Vanadium Dioxide Thin Films", Optics Communications, Sep. 11, 2008, pp. 6024-6027, Elsevier.

Zhao et al. "Metal-Insulator Transition Mechanism in VO2 Under Electric Bias" Abstract Submitted for the MAR11 Meeting of the American Physical Society, Nov. 22, 2010, 1 page.

Zimmers et al, "Electric-Field-Driven Phase Transition in Vanadium Dioxide", Abstract Submitted for the MAR11 Meeting of the American Physical Society, Nov. 26, 2010, 1 page.

\* cited by examiner

OPTICAL LIMITERS FOR FACILITATING APERTURE PROTECTION

BACKGROUND

Technical Field

The present application generally relates to aperture protection and, more specifically, to optical limiters for facilitating aperture protection.

Related Art

Proliferation of easily obtainable and affordable sources of light, such as laser pointers, has created a threat to apertures such as human eyes and sensors, since such sources of light may be utilized to blind (e.g., temporarily blind) the eyes, and/or damage and/or saturate the sensors. For example, light that is shone through a window of an aircraft vehicle may impact a pilot's ability to navigate the vehicle and may potentially lead to serious consequences.

Unfortunately, many conventional aperture protection techniques are slow to react to incident light and/or unreliable in their reaction, cause undesirable tinting/coloration, have high cost, and/or require the incident light to be of a high irradiance prior to implementing aperture protection. Therefore, there is a need for an improved approach for facilitating aperture protection.

SUMMARY

In accordance with various embodiments further discussed herein, optical limiters are provided for facilitating aperture protection from potentially harmful light. In some cases, whether incident light is considered to be potentially harmful is generally application specific and may be based on a frequency and an irradiance associated with the light. The optical limiter device may provide wide bandwidth protection, adjustable irradiance threshold, high speed response to potentially harmful light, quick recovery from the potentially harmful light, and transparency for light that is not potentially harmful.

In some embodiments, an optical limiter device may include a photocathode and a phase change material. The photocathode may cause an electron avalanche effect that provides electrons to inject into the phase change material. In this regard, in response to light that is potentially harmful and an electric field applied across the optical limiter device, a portion of the photocathode illuminated by the light may absorb the light and emit photoelectrons. Upon acceleration by the electric field, the accelerated photoelectrons may ionize atoms of the photocathode to cause emission of electrons from atoms of the photocathode. These electrons in turn may be accelerated by the electric field and, when sufficiently accelerated, cause emission of electrons from other atoms of the photocathode.

A portion of the phase change material may receive the electrons (e.g., photoelectrons, avalanche electrons) from the photocathode. In some cases, these electrons may cause heating of the portion of the phase change material to a temperature above a phase change temperature of the phase change material. In response to such heating, the portion of the phase change material transitions from a transparent phase to a reflective phase. The portion of the phase change material in the reflective phase reflects the incident light, while a remaining portion of the phase change material in the transparent phase allows other light (e.g., light considered to not be potentially harmful) to propagate through the optical limiter device to an aperture. When the potentially harmful light is removed, the portion of the phase change material reverts back to a temperature below the phase change temperature and thus transitions back to the transparent phase. In some cases, such phase change material may be referred to as thermochromic, since electrical properties (e.g., conductivity) of the phase change material are dependent on temperature. In some cases, the phase change material may be electrochromic alternative to or in addition to being thermochromic. When the phase change material is electrochromic, the increase in electron density from the injected electrons may be sufficient to switch the phase change material from the transparent phase to the reflective phase (e.g., with or without dependence on an associated heating of the phase change material by the injected electrons).

According to an embodiment, a system may include an optical device. The optical device may include a photocathode configured to emit electrons in response to an applied voltage and an incident light. The optical device may further include a phase change material. At least a portion of the phase change material may be configured to receive the electrons from the photocathode. The portion may be further configured to transition from a first phase to a second phase in response to the electrons. The portion may be further configured to reflect the incident light when the portion of the phase change material is in the second phase. In an aspect, the first phase may be a transparent phase and the second phase may be a reflective phase. The applied voltage may establish an electric field across the optical device.

According to another embodiment, a method of making the system may include providing the photocathode and the phase change material between a first and second electrode of the optical device. The photocathode may be in contact with the first electrode and the phase change material may be in contact with the second electrode. The method may further include engaging the optical device with one or more engagement elements configured to receive the optical device. The method may further include coupling a power source to the optical device.

According to another embodiment, a method may include applying a voltage to a photocathode and a phase change material. The method may include receiving incident light on at least a portion of the photocathode. The method may include providing, by the photocathode to at least a portion of the phase change material, electrons in response to the applied voltage and the incident light. The method may include transitioning the portion of the phase change material from a first phase to a second phase in response to the electrons. The method may include reflecting, by the portion of the phase change material, the incident light when the portion of the phase change material is in the second phase.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
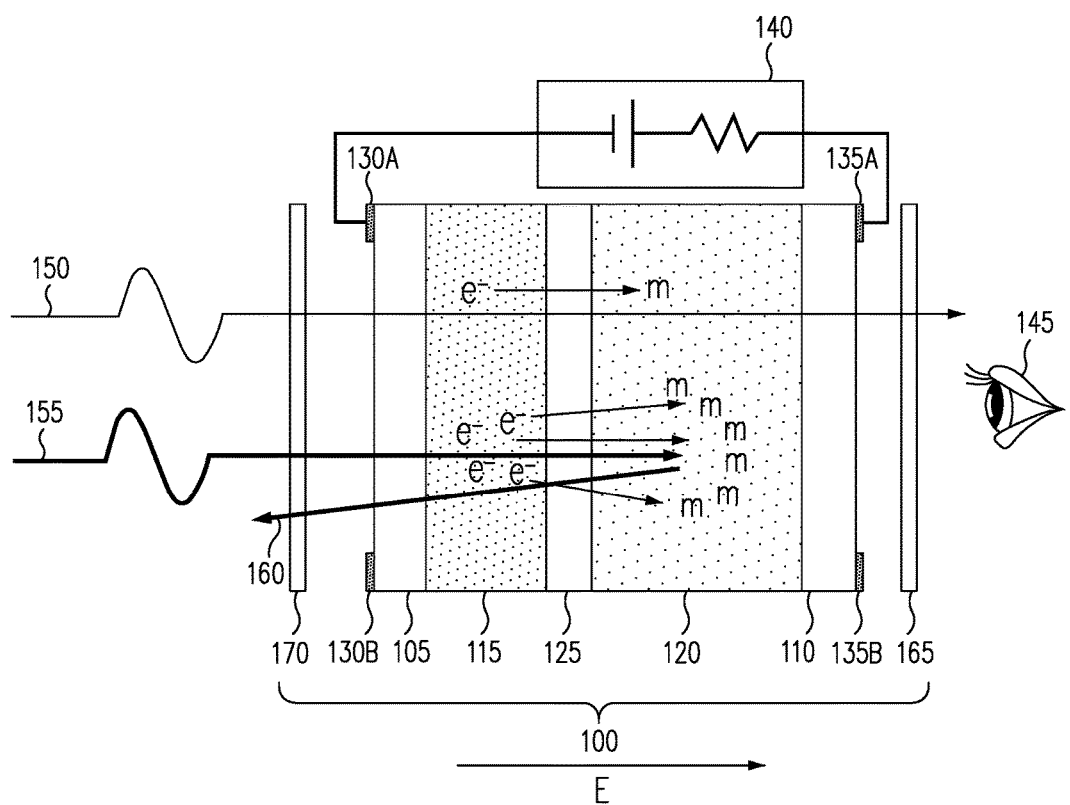
FIG. 1 illustrates an optical limiter device for facilitating aperture protection in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. It is noted that sizes of various components and distances between these components are not drawn to scale in the drawings. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate aperture protection. In some embodiments, to facilitate aperture protection, an optical limiter device may be provided to protect one or more apertures from potentially harmful light. In some cases, the optical limiter device may be implemented (e.g., positioned) in front of an aperture to prevent the potentially harmful light from reaching the aperture while allowing other light to pass through and reach the aperture. For example, apertures may include human eyes, sensors, and/or multi-functional structures. A multi-functional structure may include sensors and/or other apertures (e.g., multi-functional apertures) embedded in the structures. Absent the optical limiter device, the potentially harmful light may blind the eyes, and/or damage and/or saturate the sensors.

In an embodiment, the optical limiter device may be provided in a vehicle (e.g., terrestrial, naval, aerial, and/or space vehicles), sensors (e.g., radar system), wearable device (e.g., glasses, safety glasses, goggles, nightvision goggles, visor), and/or generally in any system in which aperture protection may be implemented such as a multi-functional structure or multi-functional aperture. In some cases, the optical limiter device may be coupled to a transparent substrate of a system to facilitate protection of the system. The transparent substrate may include glass, quartz, polycarbonate, and/or other transparent material. As an example, the optical limiter device may be provided on a windshield of an aircraft vehicle or provided as a coating on eyewear to selectively pass light. As another example, the optical limiter device may be provided as the windshield of the aircraft vehicle. When used in an aircraft vehicle, the optical limiter device may be utilized to protect pilots and/or optical equipment against incident light, which may be aimed at the pilots and/or optical equipment (e.g., such as in a laser attack).

The optical limiter device may include a photocathode and a phase change material (PCM). The photocathode may also be referred to as a photocathode layer or a transducer layer. The PCM may also be referred to as a PCM layer. In some aspects, the optical limiter device is arranged such that light to be selectively passed by the optical limiter device propagates first through the photocathode and then through the phase change material.

The photocathode may emit photoelectrons when illuminated by potentially harmful light. The photoelectrons may be accelerated by an electrical field applied across the photocathode and, upon having sufficient acceleration, cause ionization of atoms in the photocathode upon impact to provide avalanche electrons. These avalanche electrons in turn are accelerated by the electric field, cause ionization of other atoms in the photocathode upon impact, and provide further avalanche electrons.

In this regard, the photocathode may provide a frequency response range such that incident light having a frequency within the frequency response range and an irradiance above a threshold is absorbed by the photocathode and causes emission of photoelectrons by the photocathode. In some cases, the frequency response range of the photocathode may be based on a band gap associated with the photocathode. When photons of an excitation signal (e.g., electromagnetic radiation) having energy higher than the band gap of the photocathode are incident on the photocathode, the photons are absorbed by the photocathode and photoelectrons are emitted by the photocathode. For example, when the photocathode includes gallium arsenide (GaAs), the spectral response range of the photocathode may include wavelengths below around 870 nm (e.g., corresponding to the band gap of 1.42 eV for GaAs). Since frequency and wavelength are related, the frequency response range has an equivalent wavelength response range. In an aspect, the phrases frequency response range, wavelength response range, and spectral response range may be used interchangeably herein for discussion purposes. Quantum efficiency of the photocathode indicates how many electrons may be emitted by the photocathode in response to one photon. A higher quantum efficiency may be associated with faster generation of avalanche electrons.

The PCM may receive the electrons (e.g., photoelectrons and/or avalanche electrons) emitted by the photocathode. These electrons are at least partially directed to (e.g., injected into) the PCM by the applied electric field. The PCM may transition from a transparent phase to a reflective phase (e.g., also referred to as an opaque phase or a scattering phase) in response to the electrons. During the transition, regions of transparent PCM injected with an electron density (e.g., photoelectron and avalanche electron density) higher than a set threshold are converted to reflective nanocrystals. In some cases, the reflective nanocrystals may coalesce (e.g., clump together) to form a locally reflective mirror. In the reflective phase, the PCM reflects (e.g., scatters) the potentially harmful light such that the light is prevented from reaching the aperture. When the potentially harmful light is removed (and absent any additional potentially harmful light), the PCM reverts to the transparent phase. For some applications, a higher quantum efficiency of the photocathode may be desirable, where the higher quantum efficiency may allow faster generation of avalanche electrons and faster transitioning of the PCM to the reflective phase. In this regard, the reflective nanocrystals formed in the PCM may be considered as transient scattering centers that are induced by potentially harmful light and disappear once the light is removed.

In some cases, the electrons emitted by the photocathode and injected into the PCM may cause heating of the PCM to a temperature above a phase change temperature of the PCM. In an aspect, such a PCM may be referred to as being thermochromic. In other cases, the increased electron density in the PCM from the injection of photoelectrons and avalanche electrons may cause the change of the PCM to the reflective phase (e.g., with or without any bulk PCM temperature increase). In an aspect, such a PCM may be referred to as being electrochromic. A PCM may be thermochromic and electrochromic.

In some aspects, the optical limiter device allows localized transitioning of the PCM to the reflective phase. In this regard, the potentially harmful light illuminates one or more portions (e.g., but less than an entirety) of the photocathode, and the portion(s) of the photocathode illuminated by the light emits electrons. The emitted electrons are received at one or more portions of the PCM, which causes the portion(s) of the PCM that receives the electrons to transition from the transparent phase to the reflective phase. During the transition, the transparent PCM in these portion(s) is converted to reflective nanocrystals when the electron density injected into these portion(s) is above a threshold density. In this manner, the portion(s) of the PCM in the reflective phase reflect the potentially harmful light, whereas a remaining portion(s) of the PCM remain transparent and allow light to pass. The remaining portion(s) of the PCM are not illuminated by potentially harmful light. As such, scattering of the potentially harmful light may be performed without heating the entirety of the PCM, which may take a longer duration of time than localized heating (e.g., when the PCM is thermochromic) from injected electrons and cause the entirety of the PCM to become opaque. Similarly, heating the entirety of the PCM to the phase change temperature may take a longer duration of time than injecting electrons to cause the electron density of one or more portions of the PCM to exceed a threshold density to cause the transition from the transparent phase to the reflective phase (e.g., when the PCM is electrochromic).

Thus, a portion(s) of the optical limiting device effectively turns opaque in response to the potentially harmful light, whereas a portion(s) of the optical limiter device absent any incident potentially harmful light remains transparent. In some cases, opacity scales with the irradiance of the light, such that the optical limiting device provides higher opacity in response to light of higher irradiance.

In some aspects, potentially harmful light may refer to light having a certain frequency and having an irradiance above a threshold value. The frequency and threshold irradiance value may be application specific. In other words, what is considered potentially harmful light in one application may not be considered potentially harmful light in another application. As an example, for applications that may benefit from protection from laser pointers (e.g., driving a vehicle such as flying an aircraft vehicle), the frequency may include any frequency within the visible-light spectrum. The threshold irradiance value may be an irradiance value determined to cause harm (e.g., temporarily or permanently blind eyes, damage and/or saturate sensors) for a given application. In an aspect, the threshold value for the irradiance is generally selected to be above an irradiance associated with the Sun, which may be around 0.1 W/cm$^2$. In this regard, the optical limiter device is configured such that, in general, light from the Sun and other sources of ambient light are allowed through the optical limiter device and to the aperture. For example, depending on application, the threshold irradiance may be selected to be around 0.1 W/cm$^2$, 0.15 W/cm$^2$, 0.2 W/cm$^2$, 0.5 W/cm$^2$, 1 W/cm$^2$, 5 W/cm$^2$, and all values in between. It is noted that light may have multiple frequency components, with each frequency component having an irradiance value. Different frequencies may be associated with different irradiance thresholds.

Thus, using various embodiments, the optical limiter device may be configured to prevent light considered to be potentially harmful for a given application from reaching an aperture while allowing light not considered to be harmful to reach the aperture. In some embodiments, the optical limiter device provides wide bandwidth protection, adjustable irradiance threshold, high speed response to potentially harmful light, quick recovery from the potentially harmful light, and transparency for light that is not potentially harmful. In some cases, in response to a potentially harmful light, the avalanche effect of the photocathode and the transitioning of the PCM to the reflective state may be implemented in less than 1 μs.

Referring now to the drawings, FIG. 1 illustrates an optical limiter device 100 for facilitating aperture protection in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided.

The optical limiter device 100 includes an electrode 105, an electrode 110, a photocathode 115, and a PCM 120. In some cases, such as shown in FIG. 1, the photocathode 115 and PCM 120 may be separated by a gap 125 (e.g., vacuum gap). In other cases, the photocathode 115 and PCM 120 may be in contact with each other (e.g., no gap is present between the photocathode 115 and PCM 120). Metallization 130A and 130B may be formed on the electrode 105, and metallization 135A and 135B may be formed on the electrode 110. In some cases, the metallization 130A-B may be part of a common metal pad disposed on a surface of the electrode 105, such as a ring-shaped metal pad, square-shaped metal pad, spiral-shaped metal pad, and/or other shapes. Similarly, the metallization 135A-B may be part of a common metal pad disposed on a surface of the electrode 110. In other cases, the metallization 130A, 130B, 135A, and/or 135B may be separate metal pads.

The optical limiter device 100 may be coupled to a power source 140. The power source 140 may provide an electrical signal (e.g., voltage signal) to the electrode 105 via the metallization 130A and/or 130B, and an electrical signal to the electrode 110 via the metallization 135A and/or 135B. The electrical signal applied by the power source 140 establishes an electric field (denoted as E in FIG. 1) across the optical limiter device 100. In an aspect, the electrodes 105 and 110 are transparent electrodes. As an example, the electrodes 105 and/or 110 may be indium tin oxide (ITO) electrodes, and/or other electrodes with appropriate transmissivity and conductivity for a given application of the optical limiter device 100. The metallization 130A, 130B, 135A, and/or 135B may include copper (e.g., passivated copper), nickel, silver, gold, and/or generally any metal material suitable for coupling electrical signals (e.g., voltage, current) from the power source 140 to the electrodes 105 and 110.

The optical limiter device 100 selectively prevents light from propagating through the optical limiter device 100 to an aperture 145 based on frequency components and associated irradiance values of the light. In an aspect, the optical limiter device 100 determines that light incident on the optical limiter device 100 is potentially harmful light when the light has a frequency component within a certain frequency range and an irradiance above a threshold value. For example, the light may have a frequency within the visible-light spectrum and an irradiance above a threshold irradiance of 0.1 W/cm$^2$. In an embodiment, as shown in FIG. 1, the optical limiter device 100 can be implemented (e.g., positioned) in front the aperture 145 to facilitate protection of the aperture 145. Although the aperture 145 is represented as an eye in FIG. 1, the aperture 145 may be, or may include, human eyes, an aperture of a sensor, and/or generally any opening that can receive electromagnetic (EM) radiation. EM radiation may generally refer to any radiation in the EM spectrum and may be referred to as an EM beam of radiation, EM beam, light, beam, or variant thereof (e.g., EM beam of light). The term light may include visible light, infrared light, ultraviolet light, or generally any portion of the EM spectrum.

Light 150 may have a frequency outside of a frequency response range of the photocathode 115 and/or an irradiance below a threshold value, and is thus allowed to propagate through the optical limiter device 100. By contrast, light 155 may have a frequency within the frequency response range of the photocathode 115 and an irradiance at or above a threshold value (e.g., 0.1 W/cm$^2$). Thus, as shown in FIG. 1, the light 150 propagates through the optical limiter device 100 to reach the aperture 145, whereas the light 155 is reflected as light 160 and thus prevented from reaching the aperture 145 due to the optical limiter device 100. In this regard, the light 150 is considered to not be harmful whereas the light 155 is considered to be potentially harmful light. The light 150 may include ambient light, such as from the Sun, and/or any stray light. The light 155 may be from a light source such as a laser pointer or laser dazzler.

Depending on application, the optical limiter device 100 may be provided with various thicknesses. With reference to FIG. 1, the thickness of the optical limiter device 100 may refer to a distance between a leftmost surface of the electrode 105 to a rightmost surface of the electrode 110. Similarly, in FIG. 1, the thickness of each of the electrode 105, electrode 110, photocathode 115, PCM 120, and gap 125 may refer to a left to right extent of these components/features. In some cases, the optical limiter device 100 may have a thickness of around 250 nm to 1000 nm. In this example, the electrodes 105 and 110, photocathode 115, PCM 120, and gap 125 (if present) may each be between around 40 nm to around 200 nm. In some cases, the optical limiter device 100 may be thicker. For example, the optical limiter device 100 may be around centimeters in thickness. In an aspect, the gap 125 may be nonexistent to being on the order of centimeters.

In an aspect, the optical limiter device 100 may include an adhesive layer 165. For example, when an automobile vehicle has the aperture 145, the adhesive layer 165 may be an adhesive peel-and-stick layer utilized to couple the optical limiter device 100 to a windshield of the automobile vehicle to selectively prevent light from propagating to the aperture 145. In this example, the aperture 145 may include eyes of a driver and/or a passenger(s) of the automobile vehicle. In FIG. 1, the adhesive layer 165 is disposed on a surface of the electrode 110, such as to couple the optical limiter device 100 to an outer surface of a windshield (e.g., surface farther from the driver and passenger(s)). As another example, the adhesive layer 165 may be disposed on a surface of the electrode 105, such as to couple the optical limiter device 100 to an inner surface of a windshield (e.g., surface closer to the driver and passenger(s)). The adhesive layer 165 may be disposed on other portions of the optical limiter device 100.

In an aspect, the optical limiter device 100 may include a protective layer 170. The protective layer 170 may protect the optical limiter device 100 and/or a system to which the optical limiter device 100 is coupled. For example, the protective layer 170 may be an environmental protective layer that includes polymer materials to protect the optical limiter device 100 from moisture. The protective layer 170 may be in contact with the optical limiter device 100 or offset from the optical limiter device 100. Although FIG. 1 shows the adhesive layer 165 disposed on the electrode 110 and the protective layer 170 disposed on the electrode 105, alternatively and/or in addition the adhesive layer 165, protective layer 170, other adhesive layer(s), other environmental protection layer(s), and/or any other layer of material for providing structural support and/or functionality may be disposed on other components and/or portions of the optical limiter device 100.

The optical limiter device 100 selectively prevents potentially harmful light (e.g., light 150) incident on the optical limiter device 100 from propagating through the optical limiter device 100 and reaching the aperture 145 through operation of the photocathode 115, the PCM 120, and other components. In an embodiment, a portion of the photocathode 115 illuminated by potentially harmful light can absorb the potentially harmful light and emit photoelectrons in response to the absorbed light, where the potentially harmful light has a frequency within the frequency response range of the photocathode 115 and an irradiance above a threshold. The photocathode 115 generally does not absorb light that is outside of the frequency response range of the photocathode 115 and/or has an irradiance below the threshold. In an aspect, the portion of the photocathode 115 may emit electrons in response to light within at least a portion of the visible-light spectrum, infrared spectrum, and/or other EM spectrum. In effect, the portion of the photocathode 115 converts incident photon energy of the light into electrons. In some cases, the photocathode 115 may be characterized by its quantum efficiency, which provides a measure of how many electrons are emitted from the photocathode 115 in response to one incident photon.

The photocathode 115 creates an electron avalanche effect (e.g., also referred to as an electron avalanche or avalanche effect) to increase electron current using the photoelectrons as well as electrons emitted in response to the photoelectrons. In this regard, an electric field across the photocathode 115 causes the photoelectrons to be accelerated. The electric field across the photocathode 115 and the PCM 120 may be generated by applying the electrical signal (e.g., voltage signal) across the electrodes 105 and 110 via their respective metallizations 130A-B and 135A-B. As an example, the power source 140 may apply a voltage of around 5 V to around 15 V across the electrodes 105 and 110.

The electrical signal may be set to meet gain and sensitivity requirements of the optical limiter device 100. The electrical signal applied may be dependent on the material composition of the photocathode 115, PCM 120, and/or other components of the optical limiter device 100. In an aspect, the threshold irradiance of the photocathode 115 and acceleration of electrons may be based on the applied electrical signal. For example, the acceleration of the electrons may occur more rapidly in the presence of a higher applied electrical signal.

At sufficient acceleration (e.g., associated with sufficient energy), the photoelectrons may cause ionization (e.g., also known as impact ionization) of atoms in the photocathode 115 upon collision/impact of these atoms with the photoelectrons, such that electrons are emitted from these atoms. In turn, these electrons (e.g., also referred to as avalanche electrons) are accelerated by the electric field and, when sufficiently accelerated, may cause impact ionization of other atoms in the photocathode 115 to create further electrons. In FIG. 1, the photoelectrons and avalanche electrons are represented by $e^-$.

The electric field accelerates the electrons (e.g., avalanche electrons, photoelectrons) and injects them into the PCM 120. A portion of the PCM 120 that receives the electrons may transition from a transparent phase to a reflective phase in response to the injected electrons. In some aspects, the transition may be based on a temperature of the PCM 120 or portion thereof, such as when the PCM 120 is thermochromic for example. In these aspects, the transition may occur when the injected electrons have sufficient energy (e.g., due to being sufficiently accelerated) to heat the portion of the PCM 120 to a temperature above a phase change temperature $T_C$ of the PCM 120. The phase change temperature of the PCM 120 and amount of energy needed (e.g., amount of acceleration needed) to heat the portion of the PCM 120 to a temperature above the phase change temperature are generally interrelated and dependent on material composition and lattice structure of the PCM 120. In some aspects, rather than due to increased temperature, the portion of the PCM 120 may transition to the reflective phase when the portion has a high enough electron density (e.g., dependent on material composition and lattice structure of the PCM 120), such as when the PCM 120 is electrochromic. During the transition, transparent material in the portion of the PCM 120 may be converted to reflective nanocrystals, which may each be considered a scattering center and may coalesce to form a reflective mirror.

In some cases, as shown in FIG. 1, the photocathode 115 and PCM 120 are separated by the gap 125 (e.g., a vacuum gap). The gap 125 may provide an additional distance over which the electrons are accelerated by the electric field to help ensure that these electrons are sufficiently accelerated to cause phase change of the PCM 120. In other cases, the photocathode 115 and PCM 120 have abutting surfaces (e.g., no gap exists between the photocathode 115 and PCM 120). The gap 125 may be nonexistent to being on the order of centimeters. As an example, the gap 125 may be between around 40 nm to around 200 nm. Electrons may propagate through the gap 125 in around 1 µs in some cases.

When the portion of the PCM 120 is heated to a temperature above the phase change temperature of the PCM 120 (e.g., when the PCM 120 is thermochromic) and/or when the portion of the PCM 120 has an electron density above a threshold (e.g., when the PCM 120 is electrochromic), the portion of the PCM 120 transitions from the transparent phase to the reflective phase, and reflects the light 155 (e.g., the light that caused the phase change in the PCM 120). The reflected light is shown as the light 160 in FIG. 1. The portion of the PCM 120 that receive the electrons may correspond spatially with the portion of the photocathode 115 illuminated by the potentially harmful light, such that the portion of the PCM 120 that transitions to the reflective phase coincides with the propagation path of the light 155 to allow reflection (e.g., scattering) of the light 155.

Thus, the portion of the PCM 120 in the reflective phase reflects the light 155 such that the light 155 does not reach the electrode 110, thus reducing transmission of the light through the optical limiter device 100 and preventing the light from traversing through the electrode 110 and reaching the aperture 145. In this regard, the reflective nanocrystals in the PCM 120 effectively cause a portion of the optical limiter device 100 to be opaque, in that the light 155 is reflected by the reflective nanocrystals and prevented from reaching the aperture 145. In some cases, at higher density/concentration of reflective nanocrystals (e.g., number of reflective nanocrystals per unit volume), less of the light 155 can penetrate the PCM 120.

As an example of the PCM 120, the PCM 120 may include vanadium dioxide ($VO_2$). $VO_2$ has a phase change temperature of around 68° C. (340 K). At temperatures below 68° C., $VO_2$ is a transparent insulator with a monoclinic crystal structure. At temperatures above 68° C., $VO_2$ is a reflective metal with a tetragonal crystal structure similar to rutile. In this regard, at around 68° C., the electrical conductivity of $VO_2$ increases by several orders of magnitude (e.g., increases by a factor of around $10^4$), thus transitioning $VO_2$ from an insulator to a metal. As such, the transparent phase of $VO_2$ may be referred to as a transparent insulator phase or a monoclinic phase, and the reflective phase of $VO_2$ may be referred to as a metal reflective phase or a rutile phase. The reflective nanocrystals formed in $VO_2$ when in the reflective phase may be referred to as metal nanocrystals. In some cases, the bulk $VO_2$ may be doped, such as with tungsten (W). Dopants may be added to $VO_2$ to adjust the phase change temperature of $VO_2$. For example, when doped with tungsten, the phase change temperature of $VO_2$ may be decreased to around 28° C. Other material compositions of the PCM 120 may be utilized.

Thus, the electrons injected into the PCM 120 locally change the PCM 120 from a transparent material to a reflective material (e.g., also referred to as an opaque material) in the portion(s) of the PCM 120 that receives the injected electrons, such as through heating of the portion(s) (e.g., thermochromic) and/or through increasing electron density of the portion(s) (e.g., electrochromic). In an aspect, since the light 155 causes localized injection of electrons into the PCM 120 and thus localized transitioning of the PCM 120 to the reflective phase, the reflective nanocrystals that are formed in the portion(s) of the optical limiter device 100 associated with (e.g., at and in proximity to) the localized transitioning scatter the light 155, while other portions of the optical limiter device 100 remain transparent and allow light (e.g., including the light 150) to pass through to the aperture 145. The light that is allowed through the aperture 145 has a frequency outside the bandwidth of the photocathode 115 and/or has an irradiance less than threshold, and is generally considered to not be harmful. For example, when the aperture 145 includes a pilot's eyes, the pilot can see through portions of the optical limiter device 100 not blocked by reflective nanocrystals. In some cases, when the light 155 is present, any additional light (e.g., ambient light) that propagates into the optical limiter device 100 and impinges on the reflective nanocrystals of the PCM 120 may also be reflected by reflective nanocrystals, even when the optical limiter device 100 normally allows such light to pass through (e.g., the light is not potentially harmful light in twits of its frequency and/or irradiance).

As such, scattering of the potentially harmful light may be performed without heating the entirety of the PCM 120, which may cause the entirety of the PCM 120 to become opaque and may take a longer duration of time than localized heating and/or localized increase in electron density due to the injected electrons. Properties of the light 155 may determine a size (e.g., volume) of the portion of the photocathode 115 emitting electrons in response to being illuminated by the light 155 and a corresponding size of the portion of the PCM 120 transitioned to the reflective phase in response to the emitted electrons from the PCM 120. For example, the light 155 may be laser light (e.g., from a laser pointer) having a beam diameter of about 2 mm. A size of the portion of the photocathode 115 emitting electrons and a corresponding size of the portion of the PCM 120 transitioning to the reflective phase may have a diameter of a few millimeters (e.g., sizes on the same order as the beam diameter associated with the light 155).

The portion of the PCM 120 in the reflective phase remains in the reflective phase until illumination by the light 155 (and any other potentially harmful light) on the optical limiting device 100 (e.g., illumination on the portion of the photocathode 115) ends. Once the illumination by the light 155 ends, the photocathode 115 stops generating photoelectrons due to the absence of the light 155, and any portion of the PCM 120 in the reflective phase undergoes a transition from the reflective phase to the transparent phase due to the absence of injected electrons from the PCM 120. In this regard, for a thermochromic PCM, absent the injected electrons, the temperature of the portion of the PCM 120 in the reflective phase reverts back to a temperature below the phase change temperature (e.g., back to its temperature when no potentially harmful light is incident), and the portion of the PCM 120 transitions back to the transparent phase. For an electrochromic PCM, absent the injected electrons, the electron density of the portion of the PCM 120 in the reflective phase reverts back to an electron density below a threshold (e.g., back to its electron density when no potentially harmful light is incident), and the portion of the PCM 120 transitions back to the transparent phase. The reflective nanocrystals formed in this portion of the PCM 120 transition back to being transparent.

In an aspect, the transitioning of the portion of the PCM 120 from the reflective phase back to the transparent phase may be referred to as recovery of the optical limiter device 100. In this regard, the reflective nanocrystals formed in the PCM 120 may be considered as transient scattering centers of the optical limiter device 100 that are induced by the light 155 and disappear once the light 155 is removed. As such, operation of the optical limiter device 100 to transition portions of the PCM 120 to the reflective phase in response to potentially harmful light illuminated on these portions is reversible.

In operating the optical limiter device 100, the power source 140 may apply a signal (e.g., constant voltage signal) to the metallizations 130A, 130B, 135A, and 135B at all times at which that potentially harmful light may arrive, which is generally application specific. In some cases, such as in an aircraft vehicle, the signal may be applied during takeoff and landing and turned off at other times (e.g., to conserve power and/or prolong service life). For applications in potentially hostile areas, the signal may be applied at all times. The signal may be set to meet gain and sensitivity requirements of the optical limiter device 100. In this regard, the threshold irradiance of the photocathode 115 may be based on the applied signal. The signal may be adjusted to adjust the threshold irradiance of the photocathode 115. In some cases, the signal applied may be based on weather conditions, temperature conditions, and/or time of day. For example, during nighttime, when the ambient light is low and any potentially harmful light (e.g., such as from a laser pointer) may appear brighter, the signal applied by the power source 140 may be increased during nighttime relative to the signal applied during daytime. In this regard, a higher signal is generally associated with faster acceleration of the electrons, faster creation of the electron avalanche effect, faster transition to the reflective phase, and lower irradiance threshold.

As indicated above, in an aspect, the photocathode 115 provides frequency selectivity of the optical limiter device 100. The photocathode 115 may be configured with a frequency response range designed to encompass potential frequencies of light that may be used on the optical limiter device 100 (e.g., as part of a laser attack on the optical limiter device 100). A frequency difference between a highest frequency and a lowest frequency of the frequency response range may be referred to as a bandwidth. In some cases, the photocathode 115 may have a low work function, which is generally associated with a wider bandwidth (e.g., also referred to as a wider spectral response range). In these cases, the low work function of the photocathode 115 may facilitate protection of the aperture 145 from potentially harmful light of any frequency within the frequency response range of the photocathode 115. In some cases, the photocathode 115 may be configured with multiple discrete (e.g., non-continuous) frequency ranges.

By way of non-limiting example, the photocathode 115 may include multialkali, GaAs, indium gallium arsenide (InGaAs), and/or generally any material that emits electrons due to interaction of its atoms with photons in the potentially harmful light. The spectral response range (e.g., wavelength response range, frequency response range), bandwidth, threshold irradiance, and quantum efficiency associated with the photocathode 115 may be based on material composition and lattice structure of the photocathode 115. For example, the spectral response range of the photocathode 115 may be based on a band gap associated with its material composition. When the photocathode 115 includes GaAs, the spectral response range may be wavelengths below around 870 nm (e.g., corresponding to the band gap energy of 1.42 eV for GaAs).

The PCM 120 responds to elections received from the photocathode 115. Material composition and lattice structure of the PCM 120 may be selected based on the phase change temperature. In an aspect, the phase change temperature is generally selected to be higher than ambient temperature (e.g., to avoid the PCM 120 to turn opaque in response to ambient temperature), while being low enough that the phase change temperature can be reached quickly. As an example, a material that has a phase change temperature of 30° C. may turn opaque in response to ambient light from the Sun, whereas a material that has a phase change temperature of 700° C. involves more heating to reach or exceed the phase change temperature and thus is generally associated with slower response time. In an aspect, switching of the phase of the PCM 120 from transparent to reflective may be less than 1 µs. Switching of the phase of the PCM 120 from reflective to transparent may be slower than from transparent to reflective. In some cases, a bulk material of the PCM 120 may be doped, such as with metal dopants. The dopants may be provided in the PCM 120 to adjust phase change temperature for example. As an example, the PCM 120 may include $VO_2$ doped with tungsten and/or other metal dopants. In some cases, such as for electrochromic PCM, the material composition and lattice structure of the PCM 120 may be selected based on an electron density threshold that, when exceeded, causes transition to the transparent phase. The PCM 120 may be thermochromic, electrochromic, or both. The PCM 120 may include organic dyes and metal oxides.

Although the foregoing provides example material composition and/or dimensions of various components and features of the optical limiting device 100, such as material composition and/or dimensions of the electrodes 105 and 110, photocathode 115, PCM 120, and gap 125, such materials and/or dimensions are provided by way of non-limiting example. In general, the material composition and/or dimensions may be based on application (e.g., performance requirements), environmental requirements, manufacturability, cost (e.g., material cost, design cost), material availability, and/or other factors. Furthermore, in one case, the optical limiter device 100 may include the PCM 120 without the photocathode 115. In this case, a portion of the PCM 120 may emit electrons in response to light having a frequency within a frequency response range of the PCM 120 and an irradiance above a threshold. These electrons may heat and/or increase the electron density of the portion of the PCM 120 to cause the portion of the PCM 120 to transition from a transparent phase to a reflective phase. When the light is removed, the portion of the PCM 120 may transition back to the transparent phase. The frequency response range of the PCM 120 may be based on a band gap of material composition of the PCM 120. For example, when the PCM 120 includes $VO_2$, the band gap is 0.7 eV. In an aspect, an optical limiter device that includes the PCM 120 without the photocathode 115 may be associated with lower manufacturing costs and complexity.

As shown in FIG. 1, the light 150 may have one or more frequency components within the frequency range of the PCM 120 with irradiance above a threshold such that electrons are emitted by the photocathode 115 and accelerated to the PCM 120 to cause transitioning of a portion of the PCM 120 from a transparent phase to a reflective phase. In general, the optical limiter device 100 is configured such that occurrences of such electrons are rare and are insufficient to cause an avalanche effect. The localized transitioning of the portion of the PCM 120 due to such occurrences encompass a small volume of the PCM 120 and generally does not prevent most of the light 150 from propagating through the PCM 120 and to the aperture 145. Although the light 150, 155, and 160 are each shown as a single ray of light, with the light 150 and 155 being incident on the optical limiter device 100 at an angle orthogonal to the optical limiter device 100 (e.g., orthogonal to a surface of the electrode 105), such a depiction is to simplify the figure. Different portions of the light 150 and/or 155 may be incident on the optical limiter device 100 from various angles, and the light 160 may include different portions propagating at various angles. These rays of the light 150, 155, and/or 160 are not depicted in FIG. 1 in order to avoid obscuring components of FIG. 1.

Furthermore, although light (e.g., 150, 155) incident on the optical limiter device 100 is generally discussed above as having a single frequency component, the light incident on the optical limiter device 100 may have multiple frequency components, with each frequency component having an irradiance value. In this case, the photocathode 115 may emit photoelectrons in response to the frequency component(s) of the incident light within the frequency response range of the photocathode 115 and have an irradiance above a respective threshold, whereas the frequency component(s) of the incident light outside the frequency response range and/or having an irradiance below a respective threshold does not induce emission of photoelectrons. In some cases, different frequencies may be associated with different irradiance thresholds.

Figures 2, 3:
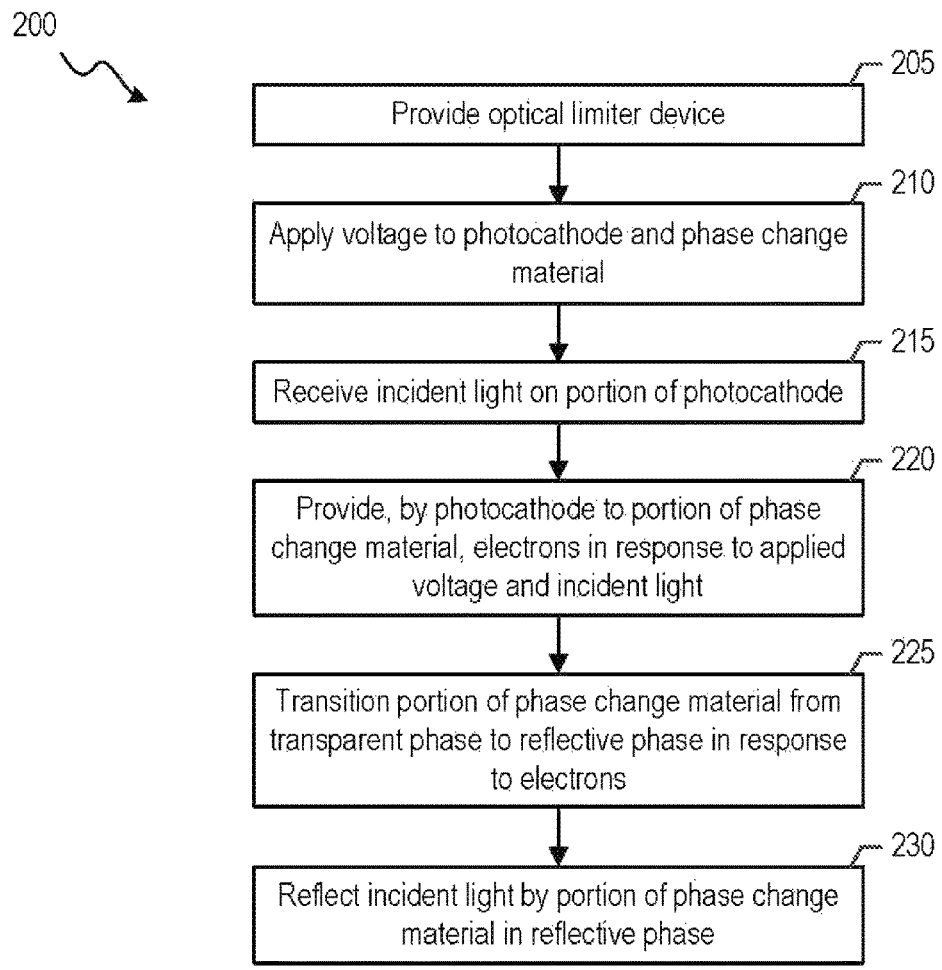
FIG. 2 illustrates a flow diagram of an example process for facilitating aperture protection in accordance with one or more embodiments of the present disclosure.
FIG. 3 illustrates a flow diagram of an example process for making a system for facilitating aperture protection in accordance with one or more embodiments of the present disclosure.

FIG. 2 illustrates a flow diagram of an example process 200 for facilitating aperture protection in accordance with one or more embodiments of the present disclosure. For explanatory purposes, the example process 200 is described herein with reference to the optical limiter device 100 of FIG. 1; however, the example process 200 is not limited to the example optical limiter device 100 of FIG. 1. Note that one or more operations may be combined, omitted, and/or performed in a different order as desired.

At block 205, the optical limiter device 100 is provided as part of a system. The system may be, may include, or may be a part of, a vehicle (e.g., terrestrial, naval, aerial, and/or space vehicles), a sensor (e.g., radar sensor), wearable device (e.g., glasses, goggle), a multi-functional structure (e.g., with one or more sensors embedded in the structure), a multi-functional aperture, and/or generally in any system in which aperture protection may be implemented. An example of a system is described with respect to FIG. 4.

At block 210, a voltage is applied by the power source 140 to the photocathode 115 and PCM 120. The applied voltage may generate (e.g., establish) an electric field across the photocathode 115 and PCM 120. At block 215, incident light (e.g., 155) is received by at least a portion of the photocathode 115. In this regard, the incident light illuminates the portion of the photocathode 115. The incident light has a frequency within the frequency response range of the photocathode 115.

At block 220, electrons are emitted by the photocathode 115 in response to the incident light and applied voltage and provided to the PCM 120. In an aspect, these electrons may include photoelectrons and avalanche electrons emitted as part of an electron avalanche effect created by the photocathode 115. In this regard, the photocathode 115 may emit photoelectrons in response to the incident light, which may be accelerated by the electric field. The accelerated photoelectrons may cause emission of electrons from atoms in the photocathode 115 due to impact ionization of the atoms. The electric field may accelerate these emitted electrons to cause impact ionization and associated emission of electrons from other atoms in the photocathode 115. The electrons formed as part of the electron avalanche effect may be accelerated and directed at least in part by the electric field to the PCM 120.

At block 225, a portion of the PCM 120 transitions from a transparent phase to a reflective phase in response to the electrons received from the photocathode 115. In an aspect, the electrons may cause heating of the portion of the PCM 120 to a temperature above a phase change temperature of the PCM 120 to cause the transition. Alternatively and/or in addition, in an aspect, the electrons may cause an electron density of the portion of the PCM 120 to exceed a threshold electron density of the PCM 120 to cause the transition. At block 230, the portion of the PCM 120 transitioned to the reflective phase reflects the incident light to prevent the incident light from reaching the electrode 110. In this manner, the optical limiter device 100 prevents the incident light from reaching the aperture 145. In some cases, when the incident light is removed, the portion of the PCM 120 that transitioned to the reflective phase at block 225 reverts back to the transparent phase.

FIG. 3 illustrates a flow diagram of an example process 300 for making a system for facilitating aperture protection in accordance with one or more embodiments of the present disclosure. For explanatory purposes, the example process 300 is described herein with reference to the optical limiter device 100 of FIG. 1; however, the example process 300 is not limited to the example optical limiter device 100 of FIG. 1. In an aspect, the example process 300 may be implemented at block 205 of the example process 200 of FIG. 2. Note that one or more operations may be combined, omitted, and/or performed in a different order as desired.

At block 305, the photocathode 115 and PCM 120 are provided between the electrode 105 and the electrode 110. The photocathode 115 may be in contact with the electrode 105. The PCM 120 may be in contact with the electrode 110. In some cases, one or more adhesive layers (e.g., 165), one or more protection layers (e.g., 170), and/or one or more other layers may be provided. The optical limiter device 100 is formed at block 305. At block 310, optical limiter device 100 is engaged to a component(s) of the system using one or more engagement elements. The optical limiter device 100 may provide a window structure to engage with these engagement elements. The engagement elements may include adhesives, nails, magnets, suction cups, bumps and ridges, and/or generally any fasteners and/or fastening structure that can support the optical limiter device 100 and/or couple the optical limiter device 100 to a component(s) of the system. As an example, an engagement element may include an adhesive peel-and-stick layer (e.g., 165) of the optical limiter device 100 that can be applied to a structural support substrate of the system. The structural support substrate may include a transparent substrate composed of glass, quartz, polycarbonate, and/or other transparent material. For instance, the structural support substrate may include a windshield of an aircraft vehicle to which the optical limiter device 100 may be adhered using the adhesive layer. Alternatively and/or in addition, the engagement element may be provided by the system to receive the optical limiter device 100. At block 315, the power source 140 may be coupled to the optical limiter device 100 to allow application of a signal (e.g., voltage signal) on the optical limiter device 100.

Figure 4:
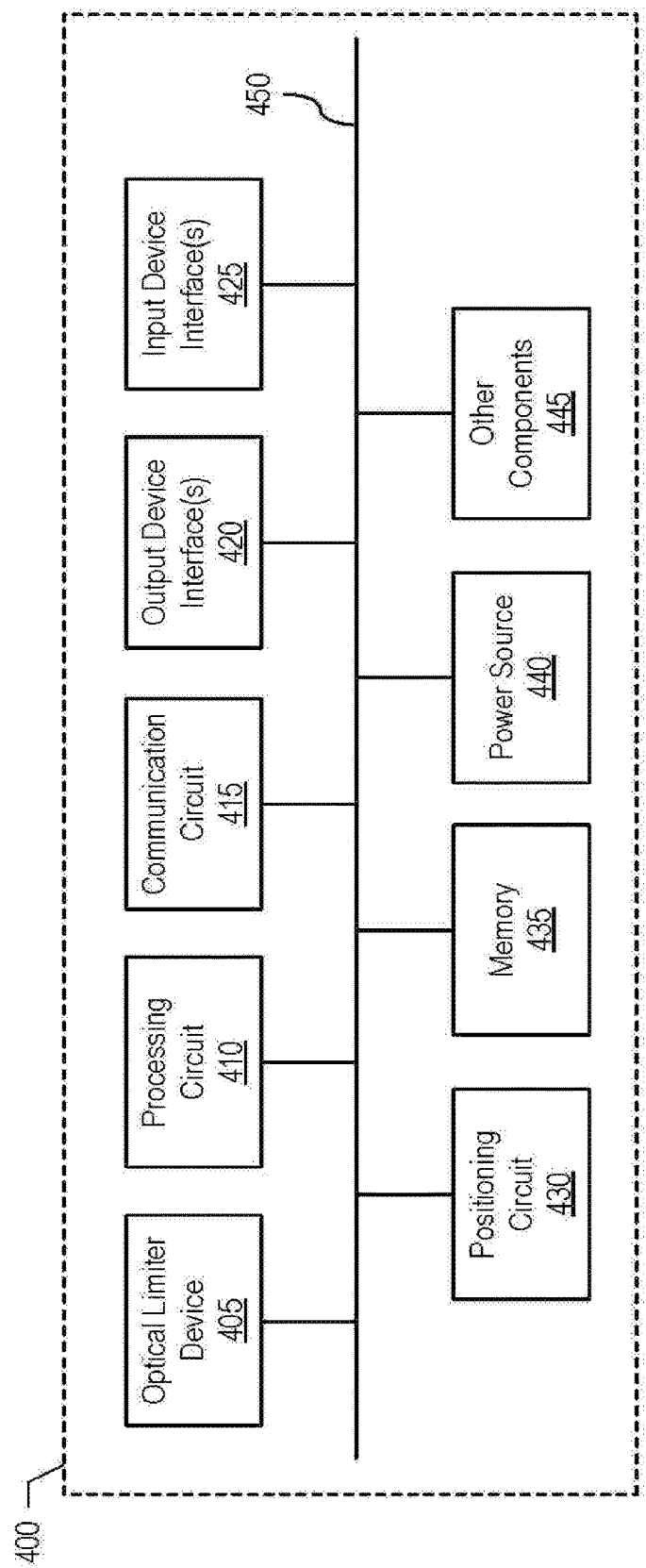
FIG. 4 illustrates a system with an optical limiter device for facilitating aperture protection in accordance with one or more embodiments of the present disclosure.

FIG. 4 illustrates a system 400 with an optical limiter device 405 for facilitating aperture protection in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 400 may be utilized in terrestrial, naval, aerial, and/or space applications with appropriate selection and configuration of components (e.g., operating frequencies, material composition, etc.). The system 400 may be, may include, or may be a part of a vehicle (e.g., automobile vehicle, aircraft vehicle, satellite), a sensor (e.g., infrared sensor), a multi-functional structure, a multi-functional aperture, or a wearable device (e.g., glasses, goggles). In an aspect, the dashed line in FIG. 4 may represent a housing of the system 400.

The system 400 includes an optical limiter device 405, a processing circuit 410, a communication circuit 415, one or more output device interfaces 420, one or more input device interfaces 425, a positioning circuit 430, a memory 435, a power source 440, other components 445, and a bus 450. The optical limiter device 405 may be utilized to prevent potentially harmful light from reaching apertures associated with the system 400. For example, when the system 400 is an aircraft vehicle, the apertures may include eyes of humans aboard the aircraft vehicle (e.g., passengers, pilot, etc.) and sensor equipment (e.g., infrared sensor equipment). In some cases, the optical limiter device 405 may be provided as a window of the system 400, or coupled to a window of the system 400. In an aspect, the system 400 may include multiple optical limiter devices, in which each optical limiter device may be used to protect one or more apertures.

In an embodiment, the optical limiter device 405 may be, may include, or may be a part of, the optical limiter device 100. As indicated above, depending on the system 400, the system 400 may additional components, different components, and/or fewer components than those shown in FIG. 4. For example, when the system 400 is implemented in a pair of glasses, the system 400 may include one optical limiter device coupled to each glass lens or placed in front of each glass lens (e.g., without many of the components shown in FIG. 4).

The processing circuit 410 may execute machine readable instructions (e.g., software, firmware, or other instructions) stored in the memory 435. In this regard, the processing circuit 410 may perform any of various operations, processes, and techniques to facilitate operation of the system 400. For example, in an aircraft vehicle, the processing circuit 410 may facilitate operation of the aircraft vehicle, including flight of the aircraft vehicles and any mission-specific processes of the aircraft vehicles (e.g., radar applications, imaging applications, etc.). The processing circuit 410 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices. In an embodiment, in response to potentially harmful light, the processing circuit 410 may generate and transmit control signals to other components within the system 400 and/or other systems, such as to mitigate any damage caused by the light (e.g., turn on backup sensor equipment to replace sensor equipment damaged by the light), discover a source of the light, and/or remove the source of the light. In some cases, the processing circuit 410 may cause the power source 440 to adjust a signal (e.g., voltage signal, current signal) applied by the power source 440 to the optical limiter device 405 (e.g., to electrodes of the optical limiter device 405).

The communication circuit 415 may be configured to handle, manage, or otherwise facilitate wired and/or wireless communication between various components of the system 400 and between the system 400 and another system. In an embodiment, the communication circuit 415 may include a wireless communication circuit (e.g., based on the IEEE 802.11 standard, Bluetooth™ standard, ZigBee™ standard, or other wireless communication standard), cellular circuit, or other appropriate communication circuit. In some cases, the communication circuit 415 may be configured for a proprietary wireless communication protocol and interface. The communication circuit 415 may include, or may be in communication with, an antenna for wireless communication. Thus, in one embodiment, the communication circuit 415 may handle, manage, or otherwise facilitate wireless communication by establishing a wireless link to a handheld device, base station, wireless router, hub, or other wireless networking device.

The communication circuit 415 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. Alternatively or in addition, the communication circuit 415 may support proprietary wired communication protocols and interfaces. The communication circuit 415 may be configured to communicate over a wired link (e.g., through a network router, switch, hub, or other network device) for purposes of wired communication. A wired link may be implemented with a power-line cable, coaxial cable, fiber-optic cable, or other cable or wires that support corresponding wired network technologies.

The output device interface(s) 420 may couple the system 400 to one or more output devices. The output device interface(s) 420 may include a graphics and/or audio driver card, graphics and/or audio driver chip, and/or graphics and/or audio driver processor. The output device(s) may enable the system 400 to provide output information to a user. For example, the output device(s) may include one or more display devices. The display device(s) may be utilized to display information to the user. For example, in response to potentially harmful light being incident on the optical limiter device 405, the display device(s) may provide information associated with the potentially harmful light. The information may include a potential position of an associated light source, images associated with a surrounding area (e.g., to facilitate detection and/or identification of additional threats), instructions for responding to the potentially harmful light and/or other threat, and/or prompts for requesting input from the user (e.g., prompt requesting the user to approve sounding an alarm). The display device(s) may include a flat screen display, a touch screen display, a light emitting diode (LED), or generally any device that may convey information visually.

The input device interface(s) 425 may couple the system 400 to one or more input devices. The input device(s) may enable the user to provide (e.g., enter) data and commands to the system 400. The input device(s) may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the system 400. In this regard, the user input may be received in any form, such as audio (e.g., speech), visual, and/or tactile. In some cases, the input device(s) may be integrated with and may also be a part of a display, such as in a touch screen display.

In an embodiment, the input device(s) and output device(s) may facilitate operation of the optical limiter device 405 by receiving feedback from and providing feedback to the user. The display device(s) may provide a user interface that allows the user to set parameters for operating the optical limiter device 405. For example, the user interface may display to the user possible frequency response ranges, irradiance thresholds, and/or phase change temperature associated with the optical limiter device 405, and allow the user to select a desired value or range of values for these parameters. Upon receiving user input via the input device(s), the user input may be provided to the processing circuit 410 (e.g., via the bus 450 and/or communication circuit 415, and the processing circuit 410 may generate and provide appropriate control signals to allow operation of the optical limiter device 405 in accordance with the user input. For example, the processing circuit 410 may determine an appropriate signal (e.g., voltage signal) to be applied by the power source 440 to the optical limiter device 405. The processing circuit 410 may determine whether the user input is valid, and may cause the display device(s) to provide feedback to the user (e.g., feedback indicating to the user that the user input is valid or not valid).

The positioning circuit 430 may be utilized to monitor a position of the system 400. The positioning circuit 430 may include, or may be in communication with (e.g., via the communication circuit 415), a global positioning system (GPS) that provides the position of the system 400.

The memory 435 may be utilized to store information for facilitating operation of system 400. By way of non-limiting example, the memory 435 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 435 may include volatile memory, such as random-access memory (RAM), dynamic RAM (DRAM), static RAM (SRAM), etc. The memory 435 may store information such as instructions to be executed by the various components (e.g., the processing circuit 410) of the system 400, buffered information to be transmitted (e.g., by the communication circuit 415), and/or other information. In some cases, the memory 435 may store information such as instructions to be executed in response to potentially harmful light.

The power source 440 may supply power to operate the system 400, such as by supplying power the various components of the system 400. In an aspect, the power source 440 may generate a signal and provide the signal to the optical limiter device 405. The power source 440 may generate the signal based on control signals from the processing circuit 410. For example, the power source 440 may include a voltage source for applying a voltage signal on the optical limiter device 405. The power source 440 may be, or may include, one or more batteries (e.g., rechargeable batteries, non-rechargeable batteries). Alternatively or in addition, the power source 440 may be, or may include, one or more solar cells. The solar cells may be utilized to supply power to operate the system 400 and/or to charge one or more rechargeable batteries. In an embodiment, the power source 440 may be, may include, or may be a part of, the power source 140 of FIG. 1.

In addition, the system 400 may include other components 445. By way of non-limiting example, the other components 445 may be used to implement any features of the system 400 as may be desired for various applications (e.g., radar imaging applications, surveillance applications, delivery applications, construction applications, etc.). The bus 450 may be utilized to facilitate communication of data between the various components of the system 400.

Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims and their equivalents.

What is claimed is:

1. A system comprising:
   an optical device comprising:
   a photocathode configured to emit electrons in response to an applied voltage and an incident light; and
   a phase change material, wherein at least a portion of the phase change material is configured to:
   receive the electrons from the photocathode;
   transition from a first phase to a second phase in response to the electrons; and
   reflect the incident light when the portion of the phase change material is in the second phase; and
   a first electrode configured to pass the incident light to the photocathode, wherein the first electrode is adjacent to the photocathode.

2. The system of claim 1, wherein the optical device further comprises:
   a second electrode adjacent to the phase change material, wherein the portion of the phase change material is configured to reflect the incident light to prevent the incident light from reaching the second electrode.

3. The system of claim 2, wherein the optical device further comprises:
   a first metal pad in contact with the first electrode;
   a second metal pad in contact with the second electrode; and
   a power source configured to provide the applied voltage to the photocathode and the phase change material via the first and second metal pads.

4. The system of claim 1, wherein the photocathode is separated from the phase change material by a vacuum gap.

5. The system of claim 1, wherein the incident light has a wavelength within a wavelength response range and an irradiance above a threshold irradiance.

6. The system of claim 5, wherein the threshold irradiance is based at least in part on a value of the applied voltage.

7. The system of claim 5, wherein the wavelength response range is based at least in part on a band gap associated with the photocathode.

8. The system of claim 1, wherein the phase change material is configured to pass ambient light.

9. The system of claim 1, wherein the portion of the phase change material is further configured to transition from the second phase to the first phase when no light within a wavelength response range and/or above a threshold irradiance is incident on the photocathode.

10. The system of claim 1, wherein the phase change material comprises metal dopants.

11. The system of claim 1, wherein the system is a vehicle, a sensor, a wearable device, or a multi-functional structure, wherein the portion of the phase change material is configured to reflect the incident light when the portion of the phase change material is in the second phase to provide protection to one or more operators of the system and/or one or more components of the system.

12. The system of claim 11, wherein:
    the system is an aircraft vehicle;
    the system further comprises:
    a housing; and
    one or more engagement elements coupled to the housing and configured to receive the optical device; and
    the optical device provides a window structure configured to engage with the one or more engagement elements and selectively pass light into the aircraft vehicle.

13. A method of making the system of claim 1, the method comprising:
    providing the photocathode and the phase change material between the first electrode and a second electrode of the optical device, wherein the photocathode is in contact with the first electrode and the phase change material is in contact with the second electrode;
    engaging the optical device with one or more engagement elements configured to receive the optical device; and
    coupling a power source to the optical device.

14. A method comprising:
    applying a voltage to a photocathode and a phase change material;
    passing incident light to the photocathode via a first electrode adjacent to the photocathode;
    receiving the incident light on at least a portion of the photocathode;
    providing, by the photocathode to at least a portion of the phase change material, electrons in response to the applied voltage and the incident light;
    transitioning the portion of the phase change material from a first phase to a second phase in response to the electrons; and
    reflecting, by the portion of the phase change material, the incident light when the portion of the phase change material is in the second phase.

15. The method of claim 14,
    wherein:
    the reflecting prevents the incident light from reaching a second electrode, and
    the second electrode is adjacent to the phase change material.

16. The method of claim 14, wherein the providing comprises passing the electrons through a vacuum gap between the photocathode and the phase change material.

17. The method of claim 14, further comprising passing ambient light through the photocathode and the phase change material.

18. The method of claim 14, further comprising transitioning the portion of the phase change material from the second phase to the first phase when no light within a wavelength response range and/or above a threshold irradiance is incident on the photocathode.

19. The method of claim 18, further comprising adjusting the threshold irradiance by adjusting the applied voltage.

20. The method of claim 14, wherein the phase change material comprises metal dopants.

* * * * *